(12) United States Patent
Yokota

(10) Patent No.: US 7,414,341 B2
(45) Date of Patent: Aug. 19, 2008

(54) MAGNETO GENERATOR

(75) Inventor: Hirohisa Yokota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/603,156

(22) Filed: Nov. 22, 2006

(65) Prior Publication Data

US 2008/0061648 A1    Mar. 13, 2008

(30) Foreign Application Priority Data

Sep. 13, 2006  (JP) .............................. 2006-248049

(51) Int. Cl.
   *H02K 21/22* (2006.01)
(52) U.S. Cl. .................... 310/156.28; 310/74
(58) Field of Classification Search .................. 310/48, 310/156, 74, 153, 156.12, 156.26, 126.28, 310/156.29, 156.31
   See application file for complete search history.

(56) References Cited

U.S. PATENT DOCUMENTS 4,115,716 A * 9/1978 Ogasawala et al. .......... 310/153
4,137,884 A * 2/1979 Odazima et al. ........ 123/149 D
4,701,654 A * 10/1987 Tatukawa et al. ............ 310/153
4,877,986 A * 10/1989 Shimizu ..................... 310/153
5,998,902 A * 12/1999 Sleder et al. ................. 310/153
7,112,906 B2 * 9/2006 Chou et al. ............. 310/156.12
2003/0146666 A1* 8/2003 Uemura et al. ................ 310/43

FOREIGN PATENT DOCUMENTS

JP    10-66287 A    3/1998
JP    2000-37054 A  2/2000

* cited by examiner

*Primary Examiner*—Dang D Le
(74) *Attorney, Agent, or Firm*—Sughrue Mion, PLLC

(57) ABSTRACT

A magneto generator can provide a flywheel with a high circularity while reducing man hours in processing the flywheel. A bowl-shaped flywheel has a cylindrical portion and a bottom. A plurality of permanent magnets are arranged on an inner peripheral wall surface of the cylindrical portion. A magnet cover is arranged along inner surfaces of the magnets, bent into a cylindrical shape, and has its opposite ends bonded to each other by a diametrically extending joint portion. A resin material is arranged on an inner side of the flywheel to integrate the magnets and the magnet cover with the flywheel. The flywheel is formed, at the bottom side of the cylindrical portion, with a pair of concave and convex portions arranged in opposition to each other. The joint portion is sandwiched between the concave and convex portions whereby the circumferential positioning of the magnets with respect to the flywheel is performed.

4 Claims, 4 Drawing Sheets

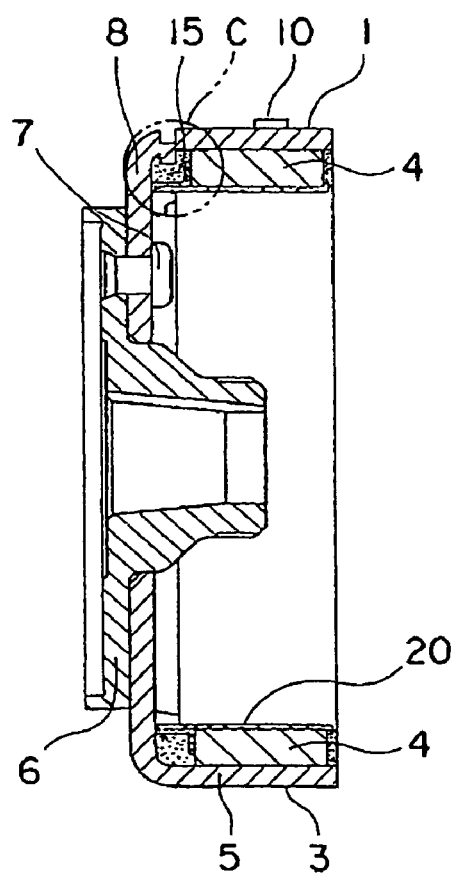
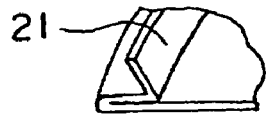

MAGNETO GENERATOR

BACKGROUND OF THE INVENTION

1. Field of the Invention

The present invention relates to a magneto generator which generates electricity under the electromagnetic induction action of permanent magnets and magneto coils in accordance with the rotation of a flywheel.

2. Description of the Related Art

In the past, there has been known a magneto generator in which a plurality of permanent magnets are arranged in a circumferential direction on an inner peripheral wall surface of a bowl-shaped flywheel while being positioned by a plurality of concave and convex portions formed on a cylindrical portion of the flywheel at equal intervals (see, for instance, a first patent document: Japanese patent publication No. H6-81437).

In order to raise the power generation efficiency of the magneto generator, it is necessary to reduce a gap (air gap) between the flywheel and a stator arranged at an inner side of the flywheel as much as possible, and to that end, the flywheel is required to have high roundness or circularity.

In the magneto generator as constructed above, however, the above-mentioned concave and convex portions are formed, for example, by driving a punch to an intermediate portion of the cylindrical portion of the flywheel at four locations spaced apart at equal intervals, and in this case, there arises a problem that the roundness or circularity of the flywheel might be reduced during the punching operation, thus resulting in difficulty in obtaining the flywheel with a high degree of circularity.

In particular, there is a problem that in case where the cylindrical portion of the flywheel, the thickness of which is decreased for reduction in size and weight thereof, is embossed or punched out from outside, it is difficult to provide the flywheel with a predetermined roundness or circularity.

SUMMARY OF THE INVENTION

Accordingly, the present invention is intended to obviate the problems as referred to above, and has for its object to obtain a magneto generator having a flywheel that can be produced with reduced man hours and with a high circularity.

Bearing the above object in mind, according to the present invention, there is provided a magneto generator including: a bowl-shaped flywheel that has a cylindrical portion and a bottom continuously formed with the cylindrical portion; a plurality of permanent magnets that are arranged on an inner peripheral wall surface of the cylindrical portion; a magnet cover that is arranged along inner surfaces of the permanent magnets, bent into a cylindrical shape, and has its opposite end portions bonded to each other by a diametrally extending joint portion; and a resin material that is arranged on an inner side of the flywheel so as to integrate the permanent magnets and the magnet cover with the flywheel. The flywheel is formed, at the bottom side of the cylindrical portion, with a pair of concave and convex portions that are arranged in opposition to each other, and the joint portion is sandwiched between the concave and convex portions whereby the circumferential positioning of the permanent magnets with respect to the flywheel is performed.

According to the magneto generator of the present invention, the man hours of processing of the flywheel can be reduced and the flywheel with a high circularity can be obtained.

The above and other objects of the present invention will be more readily understood from the following detailed description of preferred embodiments of the present invention when read in conjunction with the accompanying drawings.

BRIEF DESCRIPTION OF THE DRAWINGS

FIG. 6 is a view showing a notched portion of a bent portion at a location B in FIG. 5.

FIG. 7 is a side elevational view showing a rotor of a magneto generator according to a second embodiment of the present invention.

FIG. 8 is a view showing a bent portion at a location C in FIG. 7.

DESCRIPTION OF THE PREFERRED EMBODIMENTS

Figure 1:
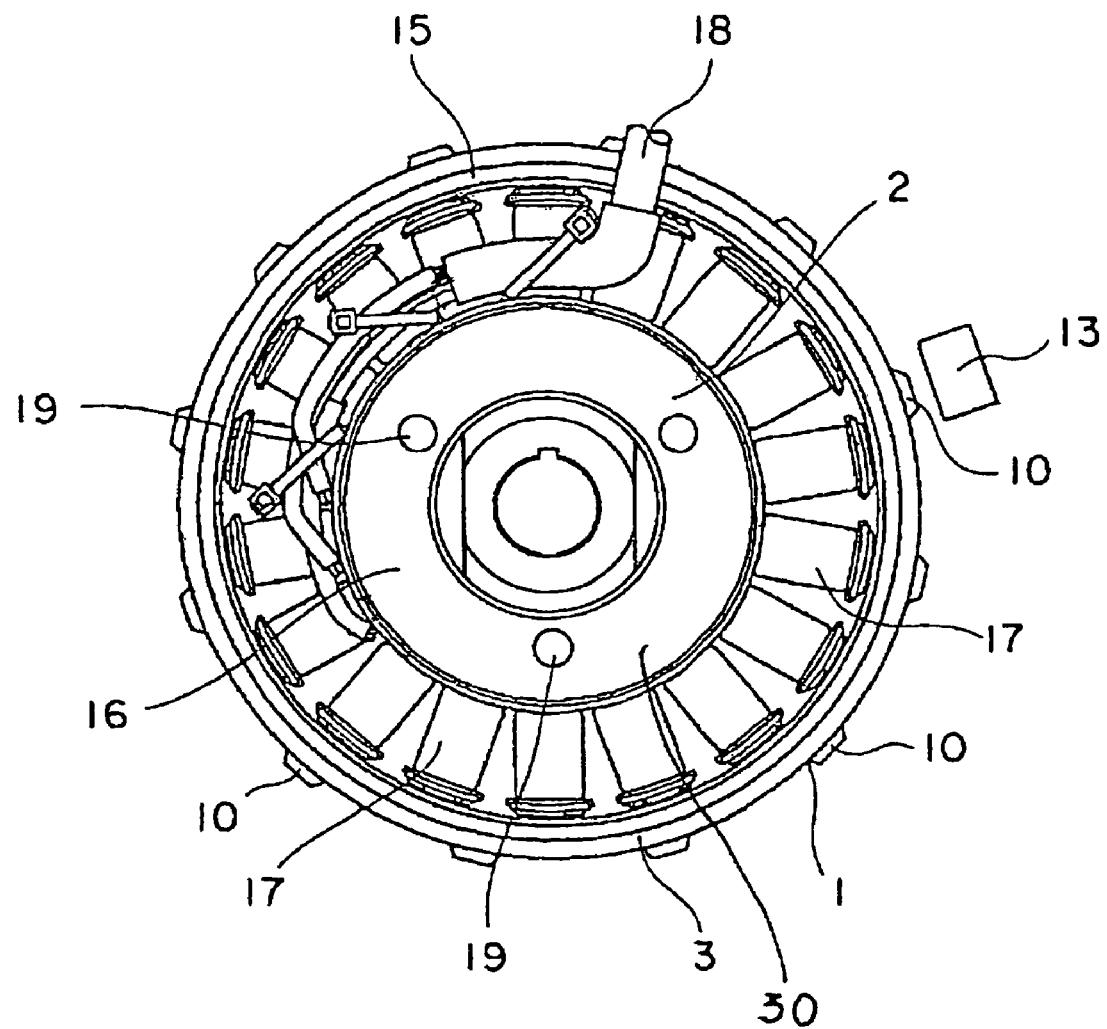
FIG. 1 is a front elevational view showing a magneto generator according to a first embodiment of the present invention.

Now, preferred embodiments of the present invention will be described in detail while referring to the accompanying drawings. Throughout respective figures, the same or corresponding members or parts are identified by the same reference numerals and characters.

Embodiment 1

Figure 2:
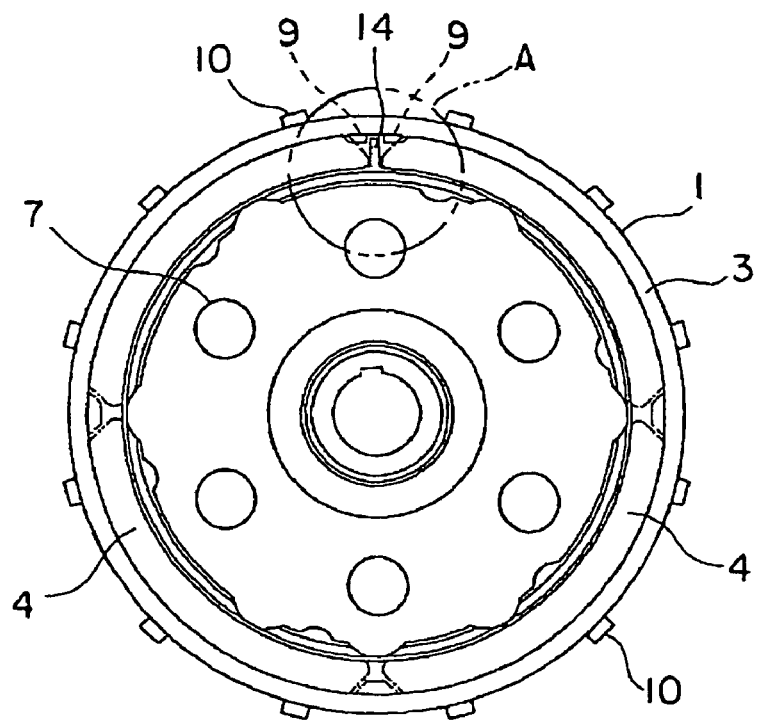
FIG. 2 is a front view of a rotor in FIG. 1.
Figure 4:
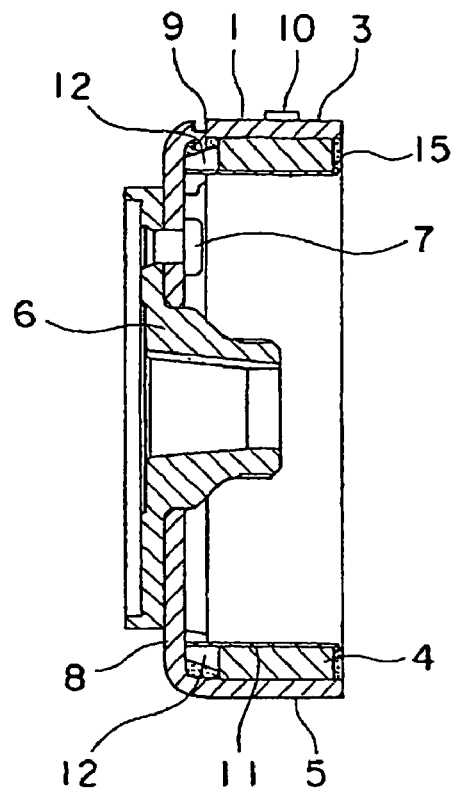
FIG. 4 is a cross sectional side view of the rotor of FIG. 2.

Referring to the drawings and first to FIG. 1, therein is shown a magneto generator according to a first embodiment of the present invention. FIG. 2 is a front elevational view of a rotor 1 in FIG. 1 (here, note that a resin material 15 is omitted), and FIG. 4 is a cross sectional side view of the rotor 1 in FIG. 2.

This magneto generator is provided with the rotor 1 that is operatively connected with an internal combustion engine, and a stator 2 that is arranged in opposition to the rotor 1 and is mounted on a fixed member (not shown). The rotor 1 is provided with a bowl-shaped flywheel 3 and permanent magnets 4.

The flywheel 3 having a bowl-shaped overall configuration includes a cylindrical portion and a bottom 8 that is continuously formed from the cylindrical portion 5. The bottom 8 is integrally coupled with a boss portion 6 by means of rivets 7. The boss portion 6 is fixedly secured to a rotation shaft (not shown) which is driven to rotate by the internal combustion engine, so that the flywheel 3 is driven to rotate about an axis of rotation.

The flywheel 3 is formed, at the bottom 8 side of the cylindrical portion 5, with a pair of concave and convex portions 9 that are arranged in opposition to each other in a circumferential direction. In addition, the cylindrical portion 5a is formed on its outer peripheral surface with a plurality of reluctors 10 for signal generation that are arranged at fixed intervals. A signal generator 13 is fixedly attached to a bracket (not shown) in a manner so as to oppose to the protruded reluctors 10.

The plurality of (e.g., four) permanent magnets 4 are fixedly secured to an inner peripheral surface of the cylindrical portion 5 of the flywheel 3. The permanent magnets are formed in such a manner that two magnets each polarized in order of N pole, S pole and N pole, and two magnets each polarized in order of S pole, N pole and S pole, are alternately arranged at mutually equal angular intervals around the axis of rotation. The plurality of permanent magnets 4 are polarized in such a manner that adjacent permanent magnets 4 have mutually opposite polarities, whereby in an inner side space of the permanent magnets 4, there are generated magnetic fields, the directions of which change alternately.

A magnet cover 11 is arranged on the inner surfaces of the permanent magnets 4. The magnet cover 11 is bent into a cylindrical shape and has its opposite ends bonded to each other by a joint portion 14 which extends in a radial or diametral direction.

Figure 3:
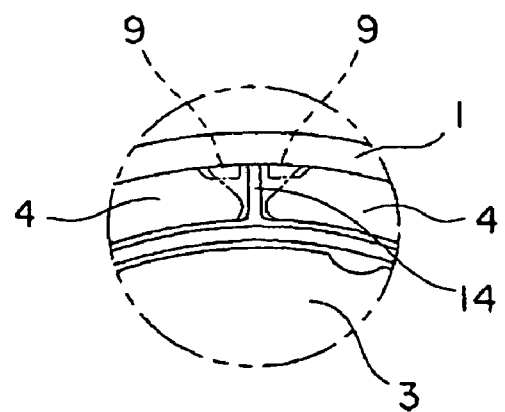
FIG. 3 is an enlarged view of a location A in FIG. 1.

A pair of concave and convex portions 9 are formed at the bottom 8 side of the cylindrical portion 5, as shown in FIG. 3, and the joint portion 14 is sandwiched or clamped between the concave and convex portions 9. Thus, the joint portion 14 is clamped by the pair of concave and convex portions 9, whereby the permanent magnets 4, being in surface contact with the magnet cover 11, are positioned with respect to the flywheel 3 in the circumferential direction thereof.

Figure 5:
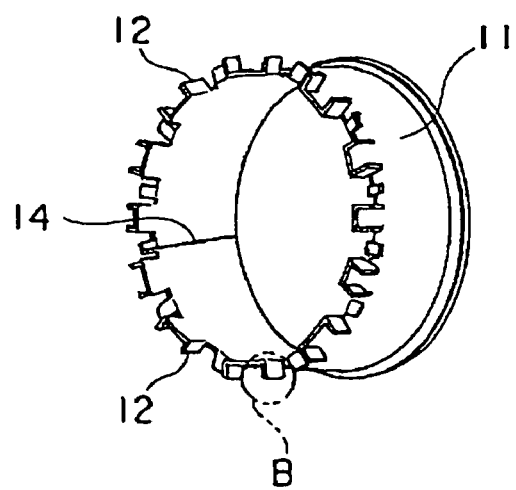
FIG. 5 is a perspective view of a magnet cover.

The magnet cover 11 is formed at an end portion of its bottom 8 with bent portions 12 that serve to position the permanent magnets 4 with respect to the flywheel 3 in the axial direction thereof. The individual bent portions 12 are formed in such a manner that they are first bent so as to be in opposition to each other in the circumferential direction, as shown in FIG. 5, and then notched or cut away at their corners, as shown by hatched lines in FIG. 6.

A resin material 5 is filled into between the axially opposite sides of the permanent magnets 4, and between the adjacent permanent magnets 4, whereby the flywheel 3, the permanent magnets 4 and the magnet cover 11 are integrated with one another by the resin material 15.

The stator 2 includes a hollow cylindrical stator core 16 and a plurality of magneto coils 17. On the outer peripheral portion of the stator core 16, there are formed a plurality of teeth that radially protrude in a diametrally outside direction at equal intervals. A conductive wire in the form of a copper wire is wound around the circumferential side surface of each tooth to form a corresponding magneto coil 17. A connecting lead 18 is connected to each of the respective magneto coils 17.

The stator core 16 having the plurality of teeth formed on its outer peripheral portion is composed of a laminated iron core (not shown) which is formed of a multitude of thin hollow magnetic steel plates in the form of cold rolled steel plates laminated one over another in the direction of the axis of rotation, and a first and a second end plate 30 superposed on opposite side surfaces of the laminated iron core, respectively, in intimate contact therewith. Three through holes 19 are formed through the laminated iron core and the first and second end plates 30 in parallel to the axis of rotation. The laminated iron core and the first and second end plates 30 arranged in intimate contact with the opposite side surfaces of the laminated iron core are integrated with one another by bolts (not shown) penetrating through the through holes 19 and nuts (not shown) threaded over the end portions of the bolts, respectively.

In the magneto generator as constructed above, the flywheel 3 is rotated in association with the rotation shaft which is driven to rotate by the internal combustion engine, whereby electric power is generated in the magneto coils 17 by the alternating fields which are brought about by the permanent magnets 4 at that time. An AC output thus generated is rectified by an unillustrated rectifier diode, and fed to a load such as a battery mounted on a vehicle.

In addition, a signal voltage is generated from the signal generator 13 each time one of the reluctors 10 approaches the signal generator 13 in accordance with the rotation of the flywheel 3, so that the rotational angle and the rotational speed of the flywheel 3 are detected from the signal voltage thus generated.

With the magneto generator according to the above-mentioned embodiment, the joint portion 14 extending in a radial or diametral direction is sandwiched or clamped between the pair of concave and convex portions 9 formed on the cylindrical portion 5, whereby the circumferential positioning of the magnet cover 11 and the permanent magnets 4 with respect to the flywheel 3 is performed.

Thus, the circumferential positioning of the permanent magnets 4 with respect to the flywheel 3 is carried out by the pair of concave and convex portions 9, so the man hours of processing the concave and convex portions 9 can be reduced as compared with a conventional one in which concave and convex portions are formed between adjacent permanent magnets, respectively.

Moreover, the man hours of processing the flywheel 3 by the use of the punch, which would exert an adverse influence on the roundness of the flywheel 3, can be reduced, so the roundness of the flywheel 3 can accordingly be improved.

Further, the concave and convex portions 9 are formed in the vicinity of the bottom 8 of the cylindrical portion 5, and hence the lengths of arms from the bottom 8 to the concave and convex portions 9 are short. Thus, a bending moment to the flywheel 3 when a load is applied by the punch to the cylindrical portion 5 in a diametrally inner direction becomes small, so the deformation of the flywheel 3 is accordingly suppressed to a small extent.

Here, note that when a conventional rotor and the rotor 1 according to the first embodiment of the present invention were made for trial purposes and the accuracies in inside diameters of flywheels 3 were examined, the inventor verified that a maximum error became smaller from 0.5 mm in the conventional one to 0.3 mm in the present invention.

Furthermore, it was also verified that the gap between the rotor 1 and the stator 2 could be set smaller because of the improvement in the roundness of the flywheel 3, so the efficiency of power generation was improved by about 3%.

In addition, in the bent portions 12 by which the axial positioning of the permanent magnets 4 with respect to the flywheel 3 is performed, corners are cut away so as to guide the resin material 15 before curing or hardening thereof to flow in a circumferential direction. Thus, the resin material 15, when filled into the interior of the flywheel 3, is caused to smoothly flow in the circumferential direction in the bent portions 12, so that the resin material 15 can spread around the entire circumference of the flywheel 3, thereby making it possible to prevent the occurrence of molding defects due to the resin material 15.

Embodiment 2

FIG. 7 is a cross sectional side view of a rotor 1 according to a second embodiment of the present invention.

In this embodiment, a magnet cover 20 has a bent portion 21 that is formed by first turning back an end portion thereof in an axial direction, and then further bending it in a diametral direction in its intermediate portion, as shown in FIG. 8.

The construction of this second embodiment other than the above is similar to that of the first embodiment.

Even in this embodiment, similar to the bent portions 12 of the first embodiment, a resin material 15, when filled into the interior of a flywheel 3, is caused to smoothly flow in a circumferential direction in the bent portion 21, so that the resin material 15 before curing or hardening thereof can spread around the entire circumference of the flywheel 3. As a result, the occurrence of molding defects due to the resin material 15 can be prevented.

While the invention has been described in terms of preferred embodiments, those skilled in the art will recognize that the invention can be practiced with modifications within the spirit and scope of the appended claims.

What is claimed is:

1. A magneto generator comprising:
   a bowl-shaped flywheel that has a cylindrical portion and a bottom continuously formed with said cylindrical portion;
   a plurality of permanent magnets that are arranged on an inner peripheral wall surface of said cylindrical portion;
   a magnet cover that is arranged along inner surfaces of said permanent magnets, bent into a cylindrical shape, and has its opposite end portions bonded to each other by a diametrally extending joint portion; and
   a resin material that is arranged on an inner side of said flywheel so as to integrate said permanent magnets and said magnet cover with said flywheel;
   wherein said flywheel is formed, at said bottom side of said cylindrical portion, with a pair of concave and convex portions that are arranged in opposition to each other, and said joint portion is sandwiched between said concave and convex portions whereby the circumferential positioning of said permanent magnets with respect to said flywheel is performed.

2. The magneto generator as set forth in claim 1, wherein said magnet cover is formed, at an end portion of said bottom side, with bent portions that serve to position said permanent magnets with respect to said flywheel in an axial direction thereof.

3. The magneto generator as set forth in claim 2, wherein said bent portions are bent in a circumferential direction, with corners thereof being cut away so as to permit said resin material before hardening thereof to flow in the circumferential direction.

4. The magneto generator as set forth in claim 1, wherein the joint portion is clamped by the pair of the concave and convex portions.

* * * * *